United States Patent
Wang et al.

(10) Patent No.: US 8,561,188 B1
(45) Date of Patent: Oct. 15, 2013

(54) COMMAND AND CONTROL CHANNEL DETECTION WITH QUERY STRING SIGNATURE

(75) Inventors: Jui Pang Wang, Banciao (TW); Ming-Tai Chang, Xizhi (TW); Jui-Chieh Wu, Sindian (TW)

(73) Assignee: Trend Micro, Inc., Tokyo (JP)

( * ) Notice: Subject to any disclaimer, the term of this patent is extended or adjusted under 35 U.S.C. 154(b) by 44 days.

(21) Appl. No.: 13/250,928

(22) Filed: Sep. 30, 2011

(51) Int. Cl.
*G06F 21/00* (2013.01)

(52) U.S. Cl.
USPC .................................. 726/22; 713/176; 726/4

(58) Field of Classification Search
None
See application file for complete search history.

(56) References Cited

U.S. PATENT DOCUMENTS

| | | | |
|---|---|---|---|
| 2011/0202500 A1* | 8/2011 | Warn et al. | 707/607 |
| 2012/0151033 A1* | 6/2012 | Baliga et al. | 709/224 |

FOREIGN PATENT DOCUMENTS

WO   WO 2011061509 A2 *   5/2011

OTHER PUBLICATIONS

William Robertson, Giovanni Vigna, Christopher Kruegel, and Richard A. Kemmerer; Using Generalization and Characterization Techniques in the Anomaly-based Detection of Web Attacks; 2006; Reliable Software Group; Department of Computer Science; University of California, Santa Barbara; pp. 1-13.*
W. Timothy Strayer, David Lapsley, Robert Walsh, and Carl Livadas, "Botnet Detection Based on Network Behavior," Chapter in Botnet Detection: Countering the Largest Security Threat, Wenke Lee, Cliff Wang, David Dagon eds., Springer, 2008.; pp. 1-10.*

* cited by examiner

*Primary Examiner* — Gilberto Barron, Jr.
*Assistant Examiner* — Malcolm Cribbs
(74) *Attorney, Agent, or Firm* — Beyer Law Group LLP (57) ABSTRACT

Detection and prevention of botnet behavior is accomplished by monitoring access request in a network. Each request includes a domain of content to access and a path of content to access, and each path includes a file name and query string. Once obtained, the query strings for each of these requests are normalized. A signature is then created for each of the normalized query strings. The obtained requests can then be grouped by signature. Once the requests have been grouped by signature, each grouping is examined to identify suspicious signatures based on common botnet behavior. Suspicious requests are used in back-end and front-end defenses against botnets.

35 Claims, 4 Drawing Sheets

COMMAND AND CONTROL CHANNEL DETECTION WITH QUERY STRING SIGNATURE

FIELD OF THE INVENTION

The present invention relates generally to computer security. More particularly, the present invention is related to command and control channel detection using a query string signature to improve detection of malicious content or entities on the Internet.

BACKGROUND OF THE INVENTION

A robot network or "botnet" is a collection of compromised computers connected to the Internet that are used for malicious purposes. When a computer becomes compromised, it becomes a part of a botnet. Typically, the owners of these compromised computers (also called robots or "bots") are unaware that they have been compromised, and the computers are often used to forward transmissions, including spam or viruses, to other computers on the Internet.

A bot is often landed to the victim through an Internet port that has been left open and through which a small Trojan horse program can be left for future activation. At a certain time, the botnet "controller" can unleash the effects of the army by sending a single command, possibly from an Internet Relay Channel (IRC) site.

The computers that form a botnet can be programmed to redirect transmissions to a specific computer, such as a Web site that can be closed down by having to handle too much traffic—a distributed denial-of-service (DDoS) attack—or, in the case of spam distribution, to many computers. The motivation for a botnet controller who creates a DDoS attack may be to cripple a competitor. The motivation for a botnet controller sending spam is in the money to be made. Both of them rely on unprotected computers that can be turned into bots.

Botnets can be difficult to detect and block. One technique commonly used is to set up a honeypot. A honeypot is a trap set to detect, deflect, or in some manner counteract attempts at unauthorized use of information systems. Generally it consists of a computer, data, or a network site that appears to be part of a network, but is actually isolated and monitored, and which seems to contain information or a resource of value to attackers. Attracted by the seemingly valuable resource of system weaknesses, the attackers may try to launch attacks against the honeypot, wherein the malicious content such as executable bot clients can be captured. The captive bot client can then be reverse engineered or emulated in the isolated environment to determine how it works. A tool can then be generated to remove the bot client. This process, however, takes time and is highly dependent on how effective the honeypot is in luring the malware source.

What is needed is a solution that improves upon prior art systems.

SUMMARY OF THE INVENTION

In a first embodiment of the present invention, a method for identifying suspicious requests for content in a system of electronic components is provided, comprising: obtaining a plurality of requests to access content, wherein each of the plurality of requests includes a domain of content to access and a path of content to access, wherein each path includes a file name and a query string; normalizing the query string for each of the plurality of requests, wherein the normalizing includes removing parameter values from the query string; creating a signature for each of the plurality of requests, using the normalized query string corresponding to each of the plurality of requests as a basis for the signature; grouping the plurality of requests by signature; identifying a signature as suspicious if requests corresponding to the signature reflect behavior identified as common botnet behavior; and identifying any requests having signatures matching suspicious signatures.

In a second embodiment of the present invention, a method for identifying suspicious requests for content in a system of electronic components is provided, comprising: retrieving a plurality of requests to access content, wherein each of the plurality of requests includes a domain of content to access and a path of content to access, wherein each path includes a file name and a query string; normalizing the query string for each of the plurality of requests, wherein the normalizing includes removing parameter values from the query string; creating a signature for each of the plurality of requests, using the normalized query string corresponding to each of the plurality of requests as a basis for the signature; grouping the plurality of requests by signature; filtering the plurality of requests by removing multiple requests having the same signature that also include the same domain of content to access while keeping the domain of content to access for each query and domain pair, removing multiple requests having the same destination address while keeping the destination address for each query and destination address pair, and removing requests having a domain that matches a domain on a white list; identifying a signature as suspicious if requests corresponding to the signature reflect behavior identified as common botnet behavior based on a combination of factors selected including at least: number of requested domains for requests sharing the same signature, domain access rate of requests sharing the same signature, distribution of content sizes of requests in requests sharing the same signature, and time-to-live of requests sharing the same signature; and identifying any requests having signatures matching suspicious signatures.

In a third embodiment of the present invention, an apparatus for identifying suspicious requests for content in a system of electronic components is provided, comprising: a processor configured to obtain a plurality of requests to access content, wherein each of the plurality of requests includes a domain of content to access and a path of content to access, wherein each path includes a file name and a query string; normalize the query string for each of the plurality of requests, wherein the normalizing includes removing parameter values from the query string; create a signature for each of the plurality of requests, using the normalized query string corresponding to each of the plurality of requests as a basis for the signature; group the plurality of requests by signature; and identify a signature as suspicious if requests corresponding to the signature reflect behavior identified as common botnet behavior.

In a fourth embodiment of the present invention, a program storage device readable by a machine tangibly embodying a program of instructions executable by the machine to perform a method for identifying suspicious requests for content in a system of electronic components is provided, the method comprising: obtaining a plurality of requests to access content, wherein each of the plurality of requests includes a domain of content to access and a path of content to access, wherein each path includes a file name and a query string; normalizing the query string for each of the plurality of requests, wherein the normalizing includes removing parameter values from the query string; creating a signature for each of the plurality of requests, using the normalized query string corresponding to each of the plurality of requests as a basis for the signature; grouping the plurality of requests by signature; identifying a signature as suspicious if requests corresponding to the signature reflect behavior identified as common botnet behavior; and identifying any requests having signatures matching suspicious signatures.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE INVENTION

Reference will now be made in detail to specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. In the following description, specific details are set forth in order to provide a thorough understanding of the present invention. The present invention may be practiced without some or all of these specific details. In addition, well known features may not have been described in detail to avoid unnecessarily obscuring the invention.

In an embodiment of the present invention, a group of many connected but disparate computers are modeled as a large network. Some of the computers are infected by HTTP bot clients, and may emit special messages between one another that distinguish them from the normal part of the network. The general behavior of command and control channels of the infected group can therefore be monitored and detected by grouping the behavior sequences of the whole network. A signature can be formed based on the command and control behavior. This allows suspicious command and control channels to be directly identified and to avoid the computer being controlled even though the bot client cannot be cleaned from the computer yet. Furthermore, the signature can be used to collect the latest fast-flux domains/IPs and monitor the status of the botnet.

Botnets commonly communicate in the Hypertext Transport Protocol (HTTP). For an HTTP botnet, there are two ways to transfer information: GET and POST. GET requests information while POST transmits information. Unlike traditional bots, the HTTP botnet's command and control server is difficult to identify due to the fact that each bot sends nearly normal HTTP requests. These stealthy requests are often undistinguishable from the requests sent by normal users. Because these requests appear to be normal HTTP requests, it is difficult to identify which device may be acting as a bot, and thus difficult to identify a server in charge of the bots.

The inventors of the present invention unexpectedly discovered that, when analyzing large numbers of GET and POST requests from groups of computers, certain patterns begin to emerge that tend to imply malicious behavior. Specifically, botnets will often involve each bot sending multiple requests to different domains, but using the same path with each of the requests. Botnets will also often involve different bots requesting the same domain with the same path.

System Diagram

Generally speaking, a request analysis may be performed at any of various levels in the hierarchy of a computer network. Some of these examples will be illustrated in this section. It should also be noted, however, that there is no requirement that both the analysis to locate suspicious requests and the actual blocking of suspicious requests be performed on or by the same device—there may be different devices devoted to each function. However, for simplicity, in this section both functions are described as being performed by the same device.

The device that performs these acts may be any device in a network. This could include individual client devices, such as smartphones, laptop computers, desktop computers, etc. as well as server devices or gateways.

System Process

As described above, the software and/or hardware that performs the steps of the present invention may be located in many different locations. Wherever these modules are located, however, they should have the ability to parse a plurality of requests for content, extracting the path and query strings, among other items.

For an HTTP GET command and control channel, the path and query string are actually the signal that are used by the bot to get a different (malicious) command from a command and control server. Since a bot will try to automatically update itself to the latest version of its software (as provided by the command and control server), the communication protocol should be synchronized to the same version. For example, the malware or malware loader's version are often synchronized to prevent the overall capacity of the botnet from being reduced. Furthermore, the communications protocol that each bot uses to communicate with each other or with the management nodes or command and control server may also be synchronized as well. Nevertheless, if the HTTP request history for many users is examined, it can be found that bots from different locations often send the same query string to different, fast changing domains. This is due to the adoption of the "fast-flux" technology. Fast flux is a DNS technique used by botnets to hide phishing and malware delivery sites behind an ever-changing network of compromised hosts acting as proxies. Since the hosts, and thus the locations of the malicious content, change quickly, it is termed "fast-flux." A variety of botnets also employ this technology to hide the location of their command and control servers.

Figure 1:
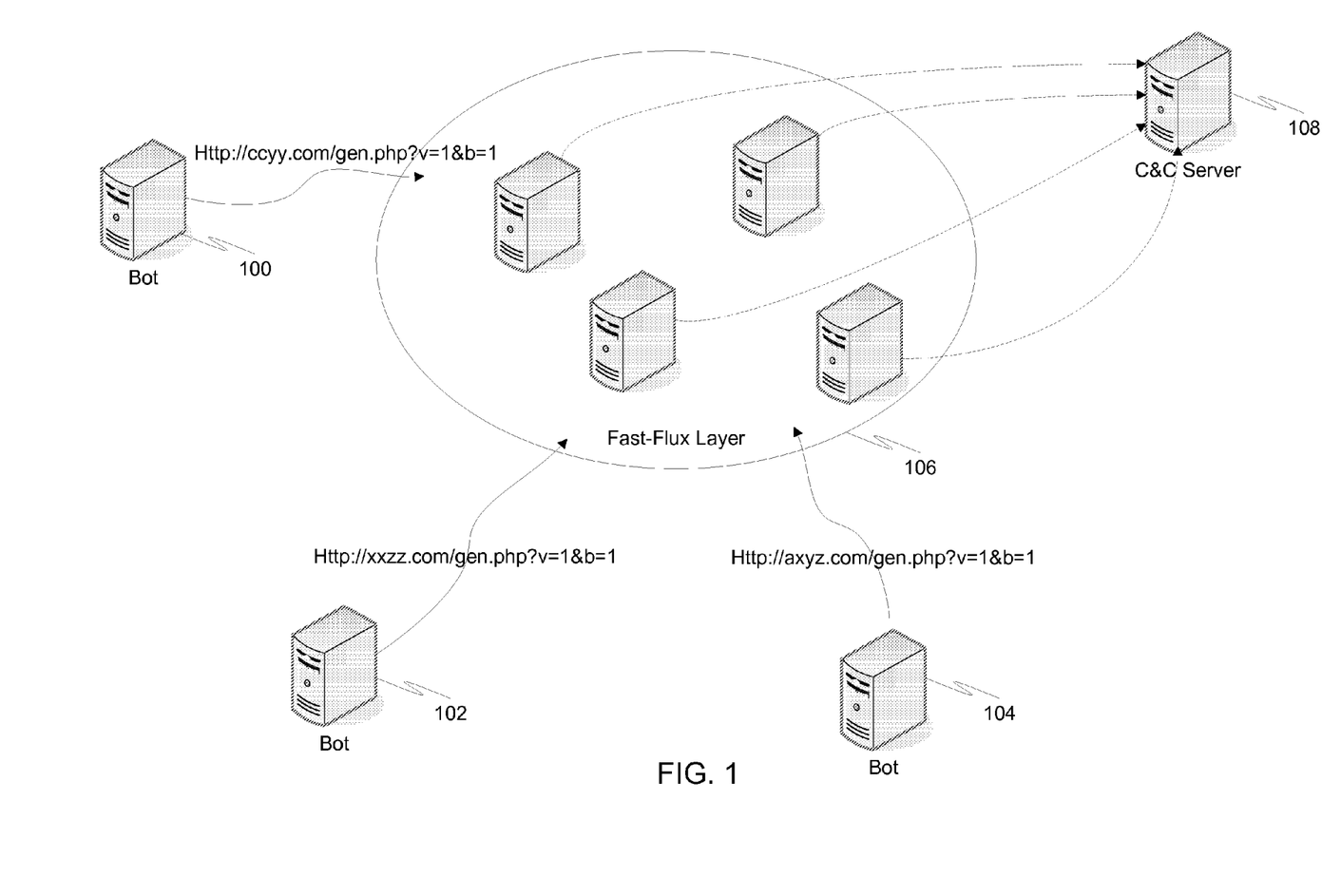
FIG. 1 is a diagram illustrating how different bots request the same command to different domains.

FIG. 1 is a diagram illustrating how different bots send the same request to different domains. Here, each bot 100, 102, 104 is issuing a similar request to a fast-flux layer 106. Since the location of the proxy is changing, the domain to which the requests are sent from each bot 100, 102, 104 is different (e.g., bot 100 is sending to domain ccyy.com whereas bot 102 is sending to domain xxzz.com). Ultimately, the command and control server 108 receives the requests through the proxies in the flux layer 106. However, the path is the same among the requests (gen.php?v=1&h=1).

Figure 2:
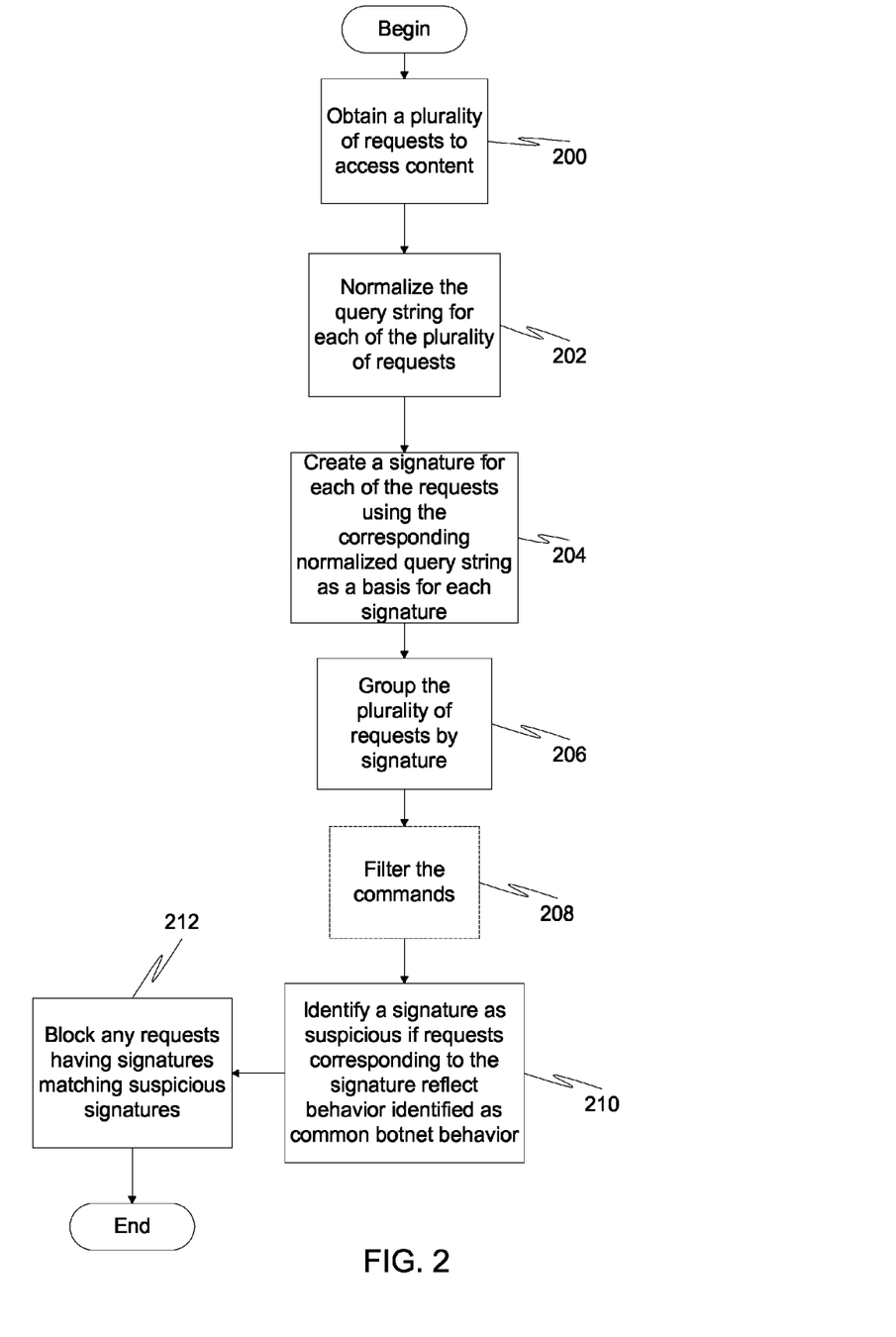
FIG. 2 is a flow diagram illustrating a method for identifying suspicious requests for content in accordance with an embodiment of the present invention.

FIG. 2 is a flow diagram illustrating a method for identifying suspicious requests for content in accordance with an embodiment of the present invention. At 200, a plurality of requests to access content are obtained. These requests may be, for example, requests by one or more web browsers to get information from one or more servers. These requests may be in the form of a domain plus a path plus a query string, as is commonly used to access web page documents.

The obtaining of the requests may be performed in a number of ways, depending upon implementation. If the method is performed by a centralized server, this server may have direct access to all requests to access content in the network. If the method is performed by a client device, the list of requests may need to be requested by the client device. Each of the plurality of requests can include a number of pieces of information, including a domain of content to access and a path of content to access, wherein each path includes a file name and a query string. It should be noted that the grouping procedure can still work even if the file name is missing, as long as the query string exists.

At 202, the query string for each of the plurality of requests is normalized. Generally, this may be performed by concatenating the query string by name-value pairs. Each name is a parameter that a server program of server 108 needs to satisfy a particular request. The values for these parameters may vary between users, but the parameters themselves are unchanged when dealing with the same trait of bots. Thus, the first step is to take the query string and eliminate the values in the query string to arrive at a normalized query string. It should be noted that while in the described embodiment only the query string is normalized, other embodiments are possible where the path (including, for example, the strings separated by slashes) can also be normalized as well, since malware tends to appear under the same directories in different websites due to the convenience of deployment.

For example, the query string:
/promote.php?username=jack&coun=US&psid=&ip=24.16.16.239 can be normalized to:
/promote.php?username &coun&psid&ip This normalized query string can then be used as a signature. Thus, at 204, a signature for each of the requests is created using the corresponding normalized query string as a basis for each signature.

If enough requests are made by different machines using the same signature, the signature can be treated as suspect. This may be performed by grouping all the gathered HTTP requests by signature. Thus, at 206, the plurality of requests are grouped by signature.

Figure 3:
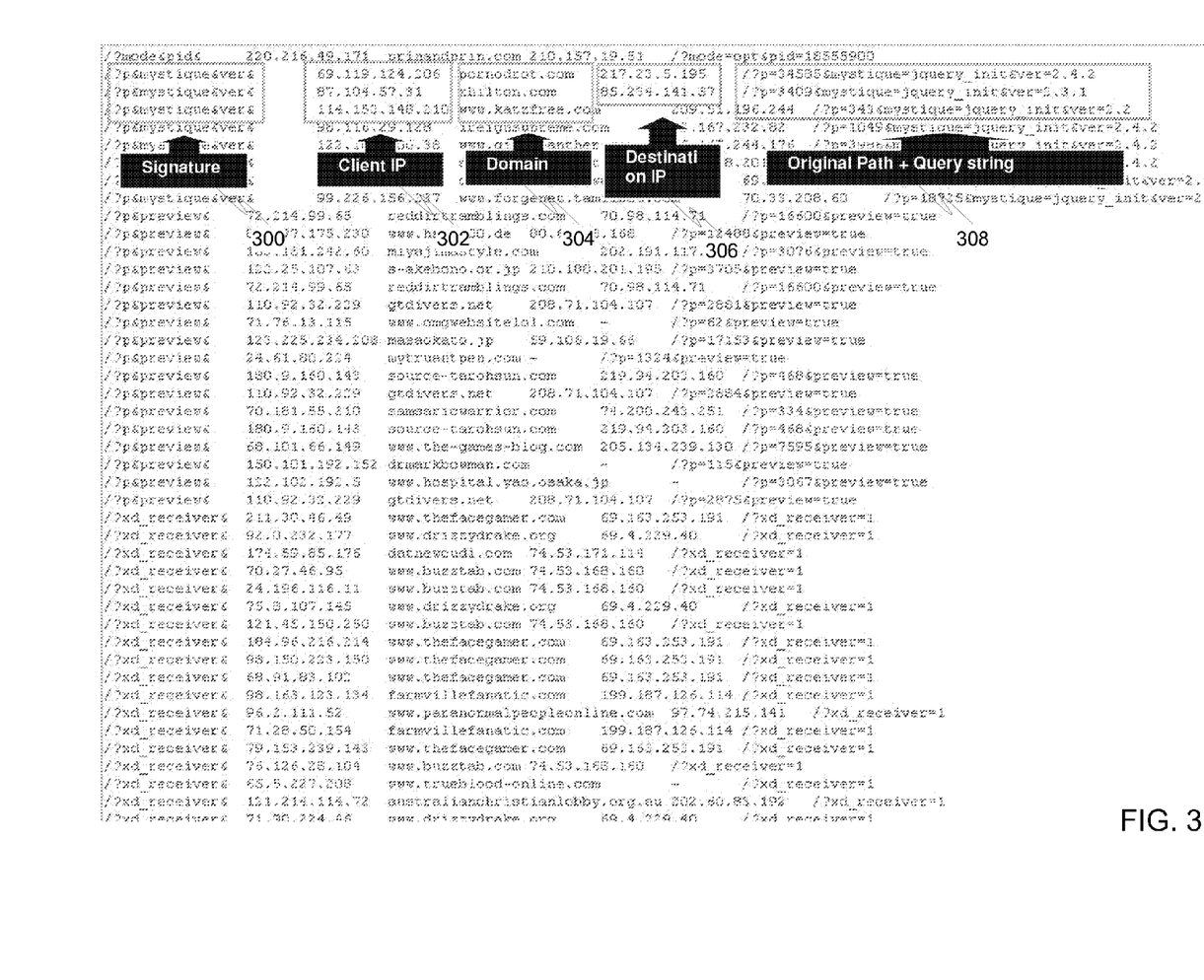
FIG. 3 is a diagram illustrating an example of requests grouped by signature in accordance with an embodiment of the present invention.

FIG. 3 is a diagram illustrating an example of requests grouped by signature in accordance with an embodiment of the present invention. Here, results are grouped by signature 300, while each row includes the signature 300 of the request, a client IP address 302 of the request, the domain 304 of the request, the destination IP address 306 of the request, and an original path plus query string 308 for the request.

Following the grouping, common botnet behaviors may be used to filter the requests. After grouping, there can be a lot of noise, such as different users requesting the same web page with different query string values, web hosting services which use the same module in their different domains around the world, and advertisement sites provided by advertising companies. As such, there are a number of techniques that can be implemented to filter the requests by eliminating non-suspect requests. Or more appropriately, requests related to likely botnet behavior are saved while other requests are removed from the suspected list. For example, requests from different users that share the same signature can be considered suspect. In one embodiment, additional factors are utilized to help prevent innocent requests from being erroneously labeled as suspect. Specifically, if the domains of requests having the same signature are not highly distributed, then it is less likely that a botnet is being utilized, and thus the requests may be less suspicious. Thus, for example, if three different requests having the same signature are directed to the same domain, it is unlikely that a botnet is being used because fast-flux usually involves constantly rotating domains. Furthermore, if the destination address of a shared signature is not highly distributed in a different subnet, then it may also be less likely that a botnet is being utilized. Thus, for example, if three different requests having the same signature are directed to different domains, but still within the same subnet, it is unlikely that a botnet is being used because fast-flux usually involves constantly rotating subnets. Additionally, certain famous hosting service sites, such as Google, MSN, and Yahoo may be added to a white list and any requests directed towards those domains may be less suspect. These are broadly shown in the flow diagram as step 208, which is indicated as optional.

Following this step, a list of suspicious requests has been preliminarily identified. At this point, it can be beneficial to attempt to confirm the suspicious nature of the requests. The inventors have identified several sources of web requests that are generally "innocent," that may be incorrectly labeled as suspect. These include common web modules that are used by different web sites, web services provided by the same company that can be mounted on different domains, such as statistics services, and advertisement modules which can be embedded in blog or social networking sites. In order to separate these requests from a real request from a bot client to a malicious command and control server, several key factors that represent botnet behavior can be examined. These include (1) a number of requested domains with the same signature, per user; (2) domain access rate; (3) average content size; and (4) time-to-live (TTL) of DNS resolving result.

As to the first factor, since a bot often sends a request to fast-flux domain, it may not successfully resolve the IP address and may need to try several fast-flux domains to get the real address of the proxy for the command and control server. As such, the number of requested domains using the same signature from the same user can be examined. If this number is too high, it can be a factor towards treating the signature as suspicious.

As to the second factor, the life cycle of fast-flux domains is short. At any given moment, a number of these domains may be inaccessible. As such, the method can examine the domain access rate of a particular computer and if too many "domain not accessible" messages are received for a given signature, it can be a factor towards treating the signature as suspicious.

As to the third factor, the content size of a command and control server is often limited to a small range if the same botnet and the same protocol are used. As such, if the content sizes of the requests (e.g., number of characters of the data being requested in requests) for a particular signature tend to be contained within a narrow range, it can be a factor towards treating requests matching the signature as suspicious. Thus, for example, if the requests sharing a particular signature all request content having sizes that are within 10 kb of each other, then requests matching the signature may be considered suspicious. There are a variety of ways to obtain the content size. The fastest way is to look at the HTTP response header. One can also use more precise ways, such as fetching the content from the Internet to obtain the content size. For heavy weight solutions like content fetching, it could increase the overall load of the system, however, since this rule is applied in the verification stage, there should be relatively fewer URLs that need to be verified.

As to the fourth factor, the general DNS TTL of fast-flux domains is less than 360 seconds. As such, if a large number of requests sharing the same signature have a TTL of less than 360 seconds, if can be a factor towards treating the signature as suspicious. The TTL of each domain can be obtained by sending queries to the domain name servers responsible for the domain.

These factors can be combined with a threshold defined from statistics of known malicious or fast-flux domains. This can be a tunable process, or can also be self-learning, to reflect the behavior change of the botnet command and control server.

Thus, at 210, a signature can be identified as suspicious if requests corresponding to the signature reflect behavior identified as common botnet behavior using one or more of the above factors. At 212, any requests having signatures matching suspicious signatures may be blocked. Typically, all requests sent towards the malicious domains will be blocked. Using the results from step 212, the outputs of this process include infected clients, computers, command and control domains IP addresses used in the suspicious requests, and command and control signatures. The output can be leveraged to provide defenses solutions for both the back-end and front-end.

For a back-end, defenses may include direct block, use of a client as a honeypot, and a signature pool for further monitoring. For direct block, the command and control domains and IPs can be imported into a current web reputation service (WRS) database, and then a pattern can be generated to block the sites directly. When the client computer is used as a honeypot, the infected clients' requests can be continually monitored to learn the latest signatures and fast flux domains used by the botnet. For a signature pool used in further monitoring, the detected signatures can be utilized to trap other fast-flux domains or monitor the scale and country distribution of each botnet based on signatures.

For a front-end, defenses may include target recovery and stopping the command and control channel Although the signature pool has great benefit to the back-end, it can also be applied to the front-end. For target recovery, a clean-up program can be directly delivered to an infected device instead of updating a more general antivirus program for all users; this helps in reducing the bandwidth utilized for general updates for all users. Regarding the stopping of the command and control channel, if the infection cannot be cleaned, all command and control requests can be stopped from the infected computer and the command and control self-update mechanism blocked. This protects the user from becoming part of the robot network and avoids confidential data loss.

Computer System Embodiment

Figure 4A:
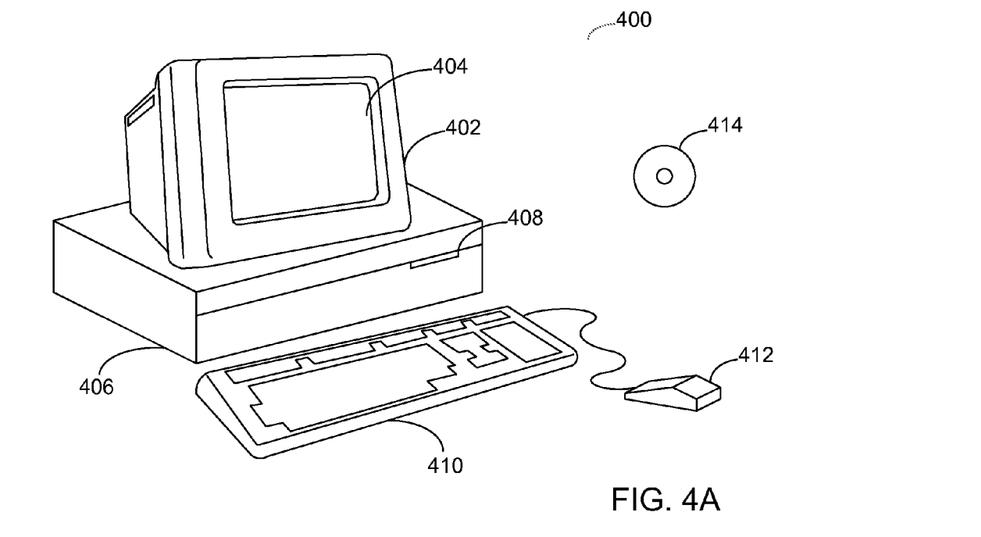
FIGS. 4A and 4B illustrate a computer system suitable for implementing embodiments of the present invention.
Figure 4B:
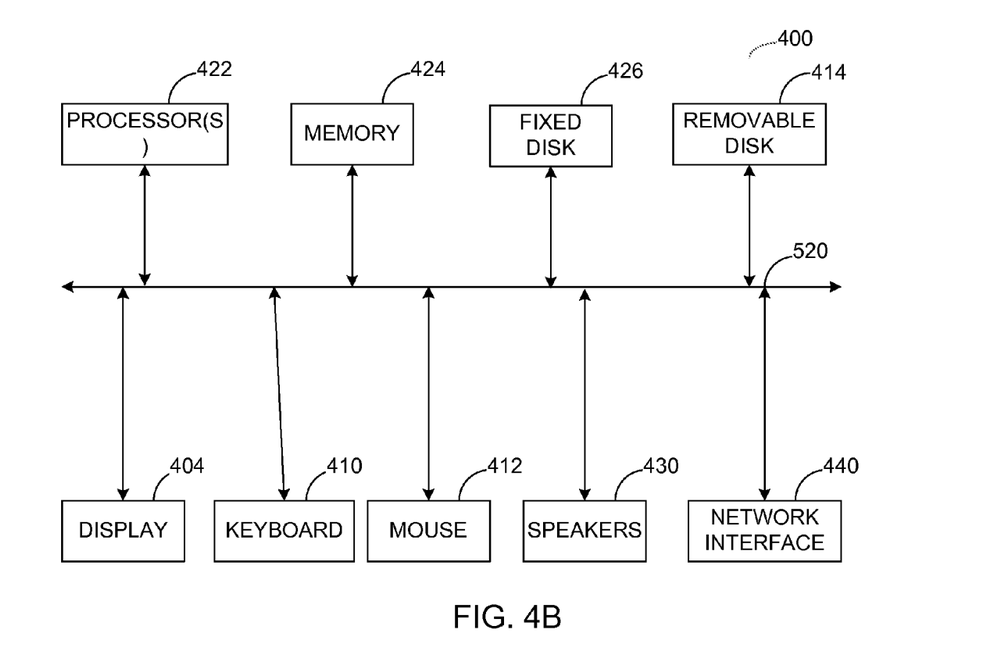

FIGS. 4A and 4B illustrate a computer system 400 suitable for implementing embodiments of the present invention. The email clustering module and/or statistical spamming analysis module may be located on such a computer system. FIG. 4 shows one possible physical form of the computer system. Of course, the computer system may have many physical forms including an integrated circuit, a printed circuit board, a small handheld device (such as a mobile telephone or PDA), a personal computer or a super computer. Computer system 400 includes a monitor 402, a display 404, a housing 406, a disk drive 408, a keyboard 410 and a mouse 412. Disk 414 is a computer-readable medium used to transfer data to and from computer system 400.

FIG. 4B is an example of a block diagram for computer system 400. Attached to system bus 420 are a wide variety of subsystems. Processor(s) 422 (also referred to as central processing units, or CPUs) are coupled to storage devices including memory 424. Memory 424 includes random access memory (RAM) and read-only memory (ROM). As is well known in the art, ROM acts to transfer data and instructions uni-directionally to the CPU and RAM is used typically to transfer data and instructions in a bi-directional manner. Both of these types of memories may include any suitable of the computer-readable media described below. A fixed disk 426 is also coupled bi-directionally to CPU 422; it provides additional data storage capacity and may also include any of the computer-readable media described below. Fixed disk 426 may be used to store programs, data and the like and is typically a secondary storage medium (such as a hard disk) that is slower than primary storage. It will be appreciated that the information retained within fixed disk 526, may, in appropriate cases, be incorporated in standard fashion as virtual memory in memory 424. Removable disk 414 may take the form of any of the computer-readable media described below.

CPU 422 is also coupled to a variety of input/output devices such as display 404, keyboard 410, mouse 412 and speakers 430. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, or other computers. CPU 422 optionally may be coupled to another computer or telecommunications network using network interface 440. With such a network interface, it is contemplated that the CPU might receive information from the network, or might output information to the network in the course of performing the above-described method steps. Furthermore, method embodiments of the present invention may execute solely upon CPU 422 or may execute over a network such as the Internet in conjunction with a remote CPU that shares a portion of the processing.

Program Storage Device Embodiment

In addition, embodiments of the present invention further relate to computer storage products with a computer-readable medium that have computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as optical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher-level code that are executed by a computer using an interpreter.

Although the foregoing invention has been described in some detail for purposes of clarity of understanding, it will be apparent that certain changes and modifications may be practiced within the scope of the appended claims. Therefore, the described embodiments should be taken as illustrative and not restrictive, and the invention should not be limited to the details given herein but should be defined by the following claims and their full scope of equivalents.

We claim:

1. A method for identifying suspicious requests for content in a system of electronic components, comprising:
    obtaining a plurality of requests to access content, wherein each of the plurality of requests includes a domain of content to access and a path of content to access, wherein each path includes a query string;
    normalizing the query string for each of the plurality of requests, wherein the normalizing includes removing parameter values from the query string;
    creating a signature for each of the plurality of requests, using the normalized query string corresponding to each of the plurality of requests as a basis for the signature;
    grouping the plurality of requests by signature;
    identifying a chosen signature as suspicious if requests corresponding to said chosen signature reflect behavior identified as common botnet behavior; and
    identifying any requests having a signature matching said identified suspicious signature.

2. The method of claim 1, further comprising:
    filtering the plurality of requests by removing multiple requests having the same signature that also include the same domain of content to access.

3. The method of claim 1, wherein each of the plurality of requests further includes a destination network address and the method further comprises:
    filtering the plurality of requests by removing multiple requests having the same signature that also include a destination address within the same subnet.

4. The method of claim 1, further comprising:
    filtering the plurality of requests by removing requests having a domain that matches a domain on a white list.

5. The method of claim 1, wherein the identifying includes:
    comparing one or more factors of requests sharing the same signature to thresholds; and
    identifying signatures as suspicious based on how many of the factors exceed the thresholds for given signatures.

6. The method of claim 5, wherein the one or more factors include one or more of the following: number of requested domains for requests sharing the same signature, domain access rate of requests sharing the same signature, upper and lower bounds of content sizes requests in requests sharing the same signature, and time-to-live of requests sharing the same signature.

7. The method of claim 5, wherein the thresholds are predetermined.

8. The method of claim 5, wherein the thresholds are dynamically determined at runtime.

9. A method for identifying suspicious requests for content in a system of electronic components, comprising:
    intercepting a plurality of requests to access content, wherein each of the plurality of requests includes a domain of content to access and a path of content to access, wherein each path includes a query string;
    normalizing the query string for each of the plurality of requests, wherein the normalizing includes removing parameter values from the query string;
    creating a signature for each of the plurality of requests, using the normalized query string corresponding to each of the plurality of requests as a basis for the signature;
    grouping the plurality of requests by signature;
    identifying a chosen signature as suspicious if requests corresponding to said chosen signature reflect behavior identified as common botnet behavior; and
    identifying any requests having a signature matching said identified suspicious signature.

10. The method of claim 9, wherein the method is performed by a server.

11. The method of claim 9, wherein the method is performed by a smartphone.

12. The method of claim 9, wherein the method is performed by a laptop computer.

13. The method of claim 9, wherein the method is performed by a desktop computer.

14. The method of claim 9, further comprising:
    removing multiple requests having the same destination address while keeping the destination address for each query and destination address pair; and
    removing requests having a domain that matches a domain on a white list.

15. A method for identifying suspicious requests for content in a system of electronic components, comprising:
    requesting a list of a plurality of requests to access content, wherein each of the plurality of requests includes a domain of content to access and a path of content to access, wherein each path includes a query string;
    normalizing the query string for each of the plurality of requests, wherein the normalizing includes removing parameter values from the query string;
    creating a signature for each of the plurality of requests, using the normalized query string corresponding to each of the plurality of requests as a basis for the signature;
    grouping the plurality of requests by signature;
    filtering the plurality of requests by removing multiple requests having the same signature that also include the same domain of content to access while keeping the domain of content to access for each query and domain pair;
    identifying a chosen signature as suspicious if requests corresponding to said chosen signature reflect behavior identified as common botnet behavior; and
    identifying any requests having a signature matching said identified suspicious signature.

16. The method of claim 15, further comprising:
    blocking command and control servers directly by importing information about destination addresses of requests corresponding to suspicious signatures into a web reputation service database.

17. The method of claim 15, further comprising:
    continually monitoring any devices identified as having sent out requests matching a suspicious signature to derive updates of the signatures and fast flux domains.

18. The method of claim 15, further comprising:
    utilizing suspicious signatures to trap fast-flux domains.

19. The method of claim 15, further comprising:
    directly delivering a clean-up solution to an infected device based on an identified of the infected device from requests matching a suspicious signature.

20. The method of claim 15, further comprising:
    stopping all command and control requests and blocking any command and control self-update mechanisms based on suspicious signatures.

21. The method of claim 15, wherein the query string and the file identifier comprise a Hypertext Transport Protocol (HTTP) GET request.

22. The method of claim 1 further comprising:
    blocking said requests identified as having a signature matching said identified suspicious signature.

23. The method of claim 9 further comprising:
blocking said requests identified as having a signature matching said identified suspicious signature.

24. The method of claim 15 further comprising:
blocking said requests identified as having a signature matching said identified suspicious signature.

25. The method of claim 1, wherein said behavior identified as common botnet behavior includes one or more of the following: number of requested domains for requests sharing the same signature, domain access rate of requests sharing the same signature, upper and lower bounds of content sizes requests in requests sharing the same signature, and time-to-live of requests sharing the same signature.

26. The method of claim 9, wherein said behavior identified as common botnet behavior includes one or more of the following: number of requested domains for requests sharing the same signature, domain access rate of requests sharing the same signature, upper and lower bounds of content sizes requests in requests sharing the same signature, and time-to-live of requests sharing the same signature.

27. The method of claim 15, wherein said behavior identified as common botnet behavior includes one or more of the following: number of requested domains for requests sharing the same signature, domain access rate of requests sharing the same signature, upper and lower bounds of content sizes requests in requests sharing the same signature, and time-to-live of requests sharing the same signature.

28. The method of claim 9 further comprising:
filtering the plurality of requests by removing multiple requests having the same signature that also include the same domain of content to access.

29. The method of claim 15 further comprising:
filtering the plurality of requests by removing multiple requests having the same signature that also include the same domain of content to access.

30. The method of claim 1 wherein at least one of said groups of requests includes a plurality of user requests that are sent to different IP addresses.

31. The method of claim 9 wherein at least one of said groups of requests includes a plurality of user requests that are sent to different IP addresses.

32. The method of claim 15 wherein at least one of said groups of requests includes a plurality of user requests that are sent to different IP addresses.

33. The method of claim 1 wherein at least one of said groups of requests includes a plurality of user requests that are sent to different second-level domains.

34. The method of claim 9 wherein at least one of said groups of requests includes a plurality of user requests that are sent to different second-level domains.

35. The method of claim 15 wherein at least one of said groups of requests includes a plurality of user requests that are sent to different second-level domains.

\* \* \* \* \*